(12) United States Patent
Strang et al.

(10) Patent No.: US 6,479,823 B1
(45) Date of Patent: Nov. 12, 2002

(54) APPARATUS AND METHOD FOR LENS ADJUSTMENT

(75) Inventors: Ward E. Strang, Fairfield, CT (US); Carol A. Howard, Oxford, CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/371,958

(22) Filed: Aug. 11, 1999

(51) Int. Cl.[7] .............................. G01J 5/02; H01J 5/02; G08B 13/00
(52) U.S. Cl. ...................... 250/342; 250/239; 250/221; 340/565
(58) Field of Search .................. 250/221, 222.1, 250/342, 352, 239, 216; 340/555, 545.3, 556, 557, 567, 565

(56) References Cited

U.S. PATENT DOCUMENTS

| | | | |
|---|---|---|---|
| 3,578,978 A | * 5/1971 | Laurent | 250/216 |
| 4,275,303 A | * 6/1981 | Mudge | 250/342 |
| 4,451,733 A | * 5/1984 | Avery et al. | 250/342 |
| 4,604,524 A | 8/1986 | Kotlicki et al. | |
| 4,672,206 A | 6/1987 | Suzuki et al. | |
| 4,795,908 A | 1/1989 | Morimoto et al. | |
| 4,896,039 A | 1/1990 | Fraden | |
| 4,939,359 A | 7/1990 | Freeman | |
| 4,960,995 A | 10/1990 | Neumann et al. | |
| 5,015,994 A | 5/1991 | Hoberman et al. | |
| 5,026,990 A | 6/1991 | Marman et al. | |
| 5,103,346 A | 4/1992 | Chang | |
| 5,128,654 A | 7/1992 | Griffin et al. | |
| 5,134,292 A | 7/1992 | Segawa et al. | |
| 5,266,807 A | 11/1993 | Neiger | |
| 5,414,255 A | 5/1995 | Hampson | |
| 5,442,178 A | 8/1995 | Baldwin | |
| 5,525,802 A | 6/1996 | Hoggins et al. | |
| 5,567,942 A | 10/1996 | Lee et al. | |
| 5,626,417 A | 5/1997 | McCavit | |
| 5,662,411 A | 9/1997 | Haslam et al. | |
| 5,739,753 A | 4/1998 | Porter | |
| 5,757,004 A | 5/1998 | Sandell et al. | |
| 5,764,146 A | 6/1998 | Baldwin et al. | |
| 5,772,326 A | 6/1998 | Batko et al. | |
| 5,780,854 A | 7/1998 | Lin | |
| 5,790,040 A | 8/1998 | Kreier et al. | |
| 5,844,240 A | 12/1998 | Lee et al. | |

* cited by examiner

Primary Examiner—Zandra Smith
(74) Attorney, Agent, or Firm—Jeffrey J. Howell; Alfred N. Goodman (57) ABSTRACT

A vernier ratchet-type lens adjuster for use with a lens array allows for fine adjustment of the coverage pattern of a sensor. The lens array can have notches, or teeth, that interact with a single tooth, or pawl, of a lens adjuster unit to maintain the position of the lens array. A user can make fine adjustments to the coverage pattern of the sensor by moving the lens array small increments. Alternatively, a rack and pinion type vernier adjuster can be used. One edge of the lens array has notches, forming the teeth of a rack portion. A pinion, or gear, has compatible teeth for mating with the rack portion. The pinion has a knob or screw accessible from a port in the sensor housing. When assembled, the rack, pinion and lens array are mated. A user can adjust the coverage pattern of the lens array by rotating the pinion, which in turn moves the rack, or the lens array, along a predetermined path.

36 Claims, 7 Drawing Sheets

APPARATUS AND METHOD FOR LENS ADJUSTMENT

FIELD OF THE INVENTION

The invention relates to an apparatus and method for adjusting the position of a lens array in a motion sensor module. More particularly, the lens array has a series of ribs, or teeth, which engage with a lens adjuster to maintain a desired position. The lens adjuster can be a single tooth or a pawl for engaging with the lens array ribs. A user can slide the lens array to a desired focal point location, and the lens adjuster will maintain the lens array position. Alternatively, the lens adjuster can be a pinion, interacting with ribs forming a rack on the lens array for vernier adjustments.

BACKGROUND OF THE INVENTION

A need exists to adjust the position of a lens array in a sensor module to eliminate blind spots in the coverage pattern of the sensor module. The coverage pattern of the sensor module determines the zone of coverage, or field of view, of the sensor.

Passive infrared sensors are commonly used in motion detectors to determine the presence or absence of individuals, generally determining if someone enters a zone of coverage. These detectors can be connected to security systems alerting others of an intrusion into the zone of coverage. These detectors can also be connected to light switches for turning lights on when a person is present in the zone of coverage, or deactivate the lights when a person is no longer present in the zone of coverage.

These motion detectors generally have a passive infrared sensor attached to a printed circuit board contained in a housing. A lens array is positioned in front of the sensor, and focuses the infrared profile of a person or object as it moves across the zone of coverage. The position of the sensor relative to the focal point of the lens array determines the coverage pattern of the sensor. The lens array is generally held in a predetermined position by a lens retainer. However, tolerance buildup during manufacture can alter the predetermined lens position. Consequently, there is a need for a lens adjuster for positioning the lens to eliminate blind spots in the sensor module coverage pattern.

Some examples of passive infrared motion detectors are U.S. Pat. No. 5,764,146 to Baldwin et al.; U.S. Pat. No. 4,672,206 to Suzuki et al.; U.S. Pat. No. 5,442,178 to Baldwin; U.S. Pat. No. 5,772,326 to Batko et al.; U.S. Pat. No. 5,790,040 to Kreier et al.; and U.S. Pat. No. 5,026,990 to Marman et al.; and are incorporated herein by reference.

SUMMARY OF THE INVENTION

Accordingly, it is a primary object of the invention to provide an adjustable lens array for use in a motion sensor module.

Another object of the invention is to provide a user adjustable lens adjuster for altering and maintaining the position of a lens array in a motion sensor module.

Another object of the present invention is to provide a user adjustable lens adjuster for retaining a lens array and altering the position of the lens array relative to a sensor.

Yet another objective of the present invention is to provide a user adjustable lens adjuster and a lens array such that the lens array can be repositioned independently along a linear dimension and have the position maintained relative to a sensor.

The foregoing objects are basically obtained by providing a lens assembly, comprising: a housing having a lens receiving area, and a first retaining member adjacent the lens receiving area; a lens coupled to the housing within the lens receiving area, the lens having a first lens retaining element, the first retaining element adjustably coupling with the first retaining member; a sensor mounted to the housing and positioned within the housing and behind the lens, wherein the lens is adjustably movable about the sensor between a first position and a second position in a first direction as the first retaining element moves relative to the first retaining member, and the lens is further adjustably movable about the sensor between a third position and a fourth position in a second direction, which is transverse to the first direction, as the second retaining element moves relative to the second retaining member.

The objects are flirter obtained by providing a method of adjusting a lens comprising the steps of providing a housing having a lens receiving area, and a first retaining member adjacent the lens receiving area; providing a lens coupled to the housing within the lens receiving area, the lens having a first lens retaining element, the first retaining element adjustably coupling with the first retaining member; providing a sensor mounted to the housing and positioned within the housing and behind the lens, moving the lens about the sensor between a first fixed position and a second fixed position in a first direction.

The objects are further obtained by providing a lens assembly, comprising: a housing having an outer surface, a lens receiving area, and a first retaining member adjacent the lens receiving area; a lens coupled to the housing within the lens receiving area, the lens having a first lens retaining element, the first retaining element adjustably coupling with the first retaining member; a sensor mounted to the housing and positioned within the housing and behind the lens, wherein the lens is adjustably movable about the sensor between a first position and a second position in a first direction as the first retaining element moves relative to the first retaining member, and the first retaining member extending from the outer surface of the housing to direct contact with the lens, and the first retaining member being movable between an original position and a final position while engaging the lens to move the lens between the first and second positions.

The objects are still further obtained by providing a method of adjusting a lens, comprising the steps of: providing a housing having an outer surface, a lens receiving area, and a first retaining member adjacent the lens receiving area; providing a lens coupled to the housing within the lens receiving area, the lens having a first lens retaining element, the first retaining element adjustably coupling with the first retaining member; providing a sensor mounted to the housing and positioned within the housing and behind the lens; moving the lens about the sensor between a first position and a second position in a first direction as the first retaining element moves relative to the first retaining member by moving the first retaining member.

Other advantages and salient features of the invention will become apparent from the following detailed description, which, when taken in conjunction with the annexed drawings, discloses preferred embodiments of the present invention.

BRIEF DESCRIPTION OF THE DRAWINGS

Referring to the drawings which form a part of the original disclosure.

DETAILED DESCRIPTION OF THE PREFERRED EMBODIMENT

FIGS. 1–7 depict a sensor module 10 according to this invention. The sensor module 10 comprises a rear housing member 12 which can be mounted to a mounting surface such as a wall of a house as known in the art, and a front housing member 14 which attaches to the rear housing member 12. A sensor 16 is mounted on a circuit board 18 within the sensor module 10 as generally known in the art. The sensor 16 can be any perimeter sensor known in the art, such as a passive infrared (PIR) sensor, ultrasonic sensor, temperature sensor, light sensor, relative humidity sensor, a sensor for the detection of carbon dioxide or other gases or ions, an audio sensor, or any other passive or active sensor that can be used to detect movement or change from the nominal environment. For example, the sensor can detect changes in vibration or sound, temperature, visual, ionic and moisture conditions. In the preferred embodiment the sensor 16 is a PIR sensor.

An adjustable lens assembly 20 is positioned in front of and in the field of view of the PIR sensor 16 for focusing infrared radiation. The adjustable lens assembly 20 comprises a lens 22 held in position between a lens retainer 24 and a lens adjuster 26. Lens 22 is preferably a lens array. The adjustable lens assembly 20 is positioned in front of and in the field of view of the PIR sensor 16, and is mostly visible through an open window 28 or lens receiving area located in the front housing member 14. When the PIR sensor is used, the lens 22 is preferably a fresnal lens, however, the lens 22 can vary with the type of sensor 16 used. When a PIR sensor is used, the lens 22 focuses IR in the field of view to a focal point at the sensor. The lens retainer 24 is provided for holding the lens 22 in place a predetermined distance from the sensor 16. The window 28 allows the sensor 16 to view the ambient environment. The lens adjuster 26 interfaces with lens 22 for positioning lens 22 as need for focusing. Except for the adjustable lens array assembly 20, the structure and functioning of sensor module 10 is generally known in the art.

Figure 1:
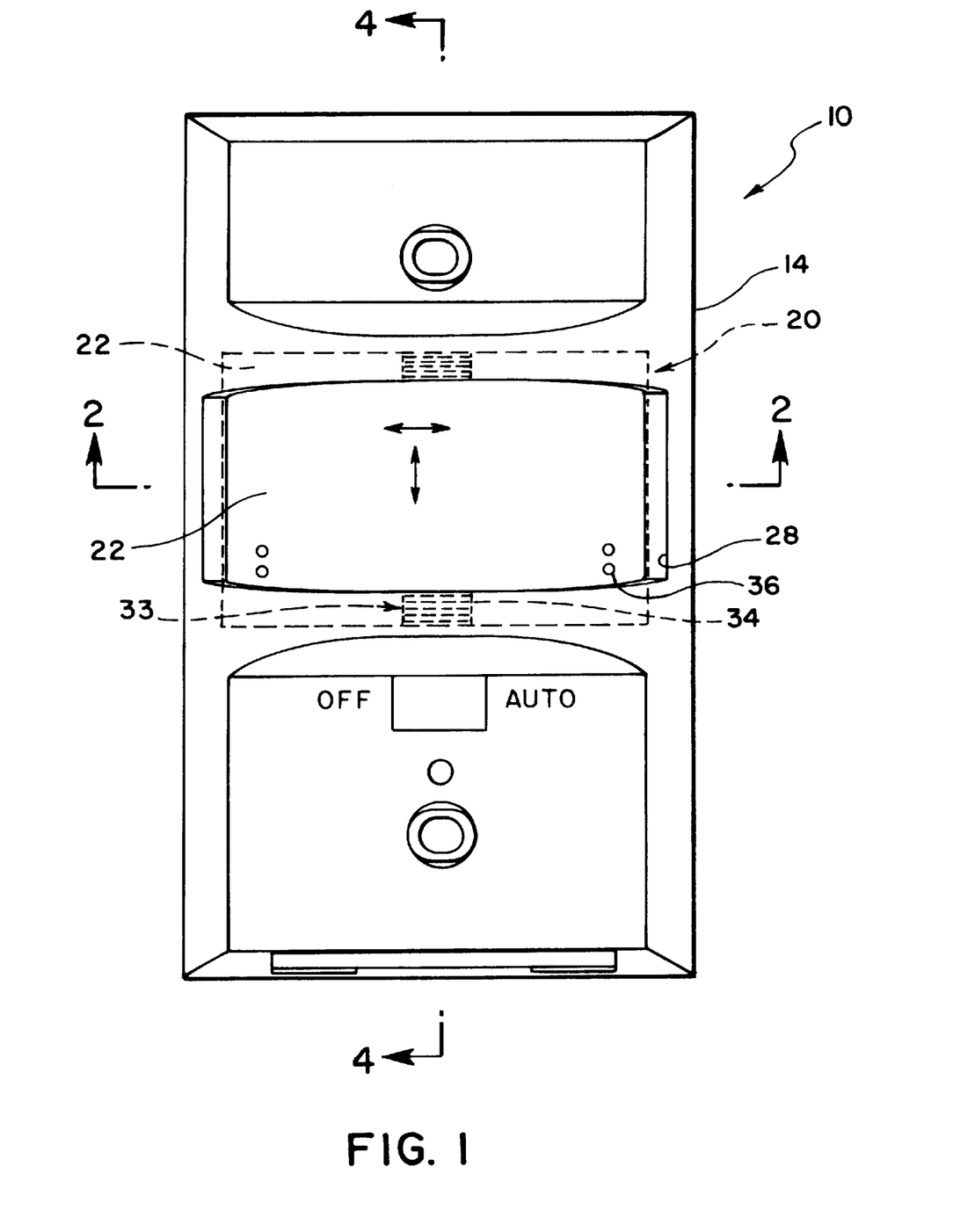
FIG. 1 is a front view of an adjustable lens array within a sensor module constructed in accordance with a first embodiment of the present invention.
Figure 6:
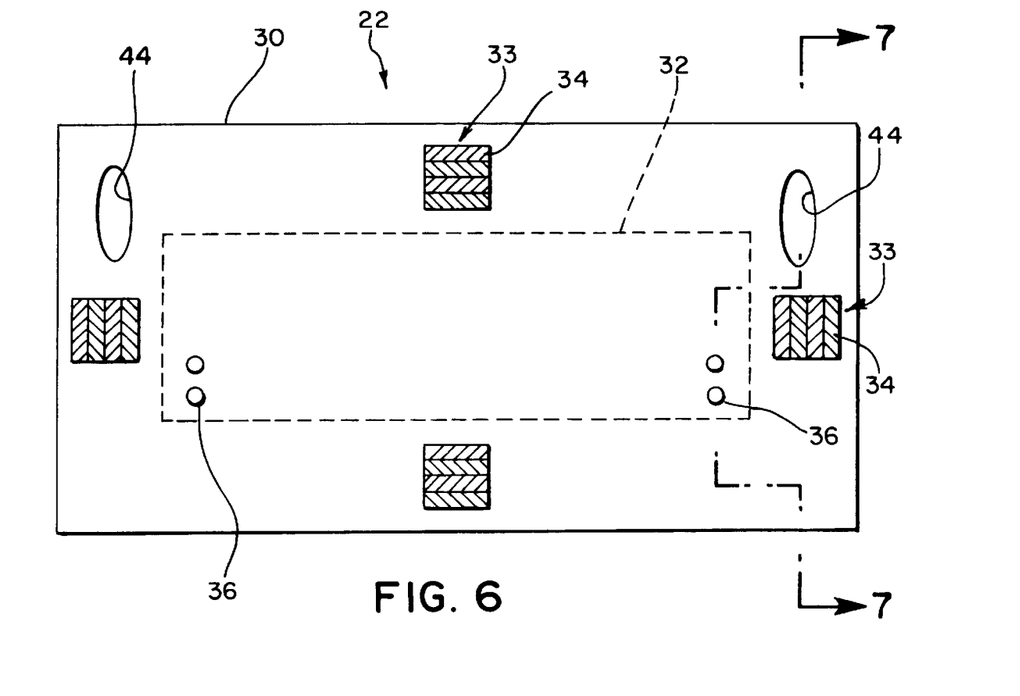
FIG. 6 is a front view of the lens array constructed in accordance with the first embodiment of the present invention.

The adjustable lens array assembly 20 allows for a lens 22 to be adjusted horizontally or vertically in order to optimize focusing for the sensor 16. The lens 22 has an outer perimeter lens portion 30 and an inner lens portion 32. The outer lens portion 30 has at least one set of ribs or teeth 33 or retaining elements, each set having at least two teeth 34.

The outer perimeter portion 30 of the lens array 22 is generally not used to focus desired ambient parameters for use by the sensor, and is therefore optimum for location of the teeth 34 and other ancillary lens array protrusions and voids. Ribs or teeth 34 are shown approximately centered along the four sides of the outer perimeter portion 30. Teeth 34 can be in a predetermined orientation to emphasize adjustment in a target direction. The target direction can be vertical or horizontal relative to the mounting position of the sensor module. Additionally, the teeth 34 can be shaped and positioned to result in some rotational movement of the lens 22. Furthermore, the teeth 34 can be shaped and positioned to result in movement along the Z-axis, that is, away from or towards the sensor 16. This can most easily occur when only one set of teeth 34 is moved relative to a single lens adjuster 26.

The inner lens portion 32 is the focusing portion of the lens 22 and may have a series of raised nubs 36. The focusing portion is generally known in the art. The raised nubs 36 allow a user to grip the lens 22 and reposition the lens.

Teeth 34 are preferably any shape gear-type teeth known in the art, either attached integrally to the lens 22 or pressed through the lens 22. When the set of teeth 34 are positioned on a face of the lens 22, it is preferable that each tooth 34 be located near the middle of each side and near the edge of the lens 22 so as not to interfere with the focusing function of the inner lens portion 32.

Figure 2:
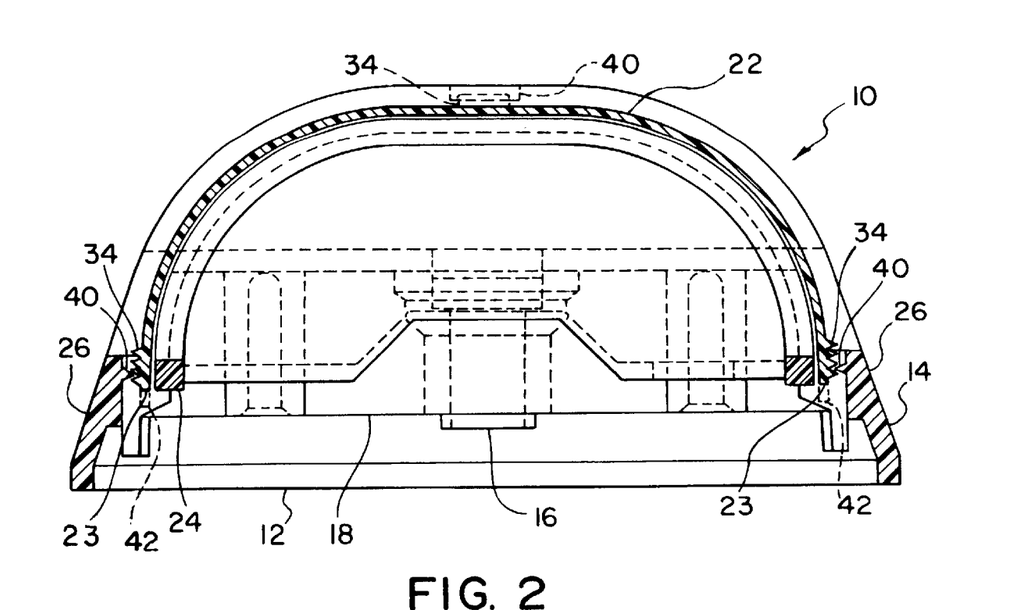
FIG. 2 is a cross-sectional view of the adjustable lens array taken along line 2—2 of FIG. 1.
Figure 3:
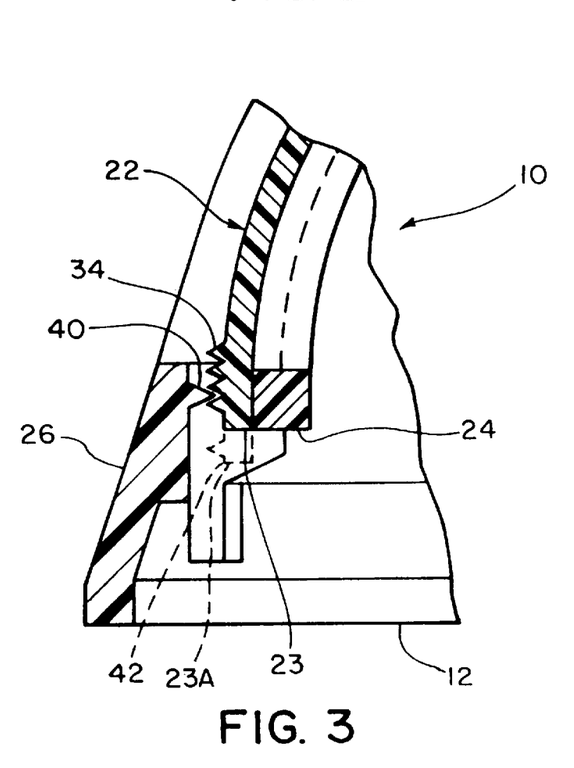
FIG. 3 is an enlarged, partial, cross-sectional view of one end of the adjustable lens taken along line 2—2 in FIG. 1.
Figure 4:
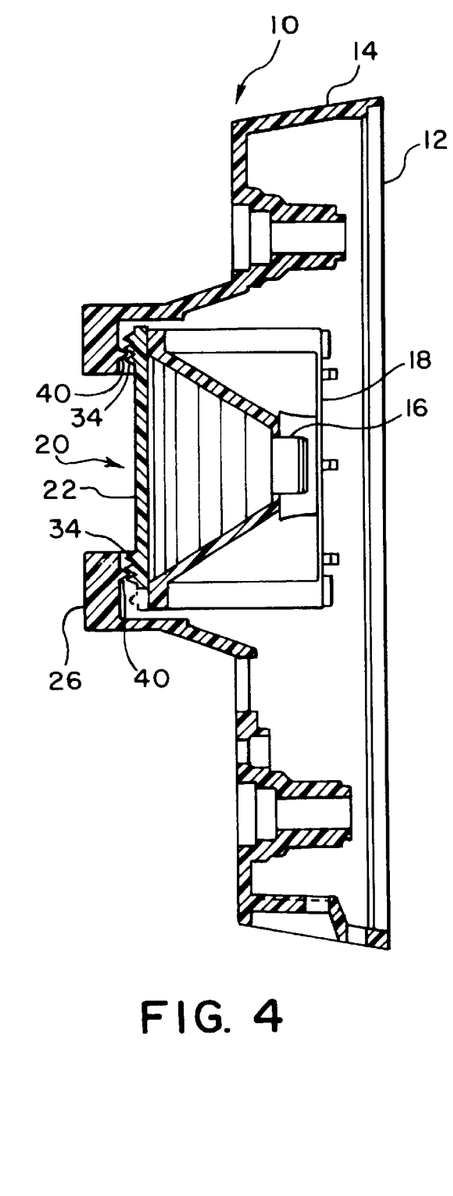
FIG. 4 is a cross-sectional view of the adjustable lens array taken along line 4—4 of FIG. 1.
Figure 5:
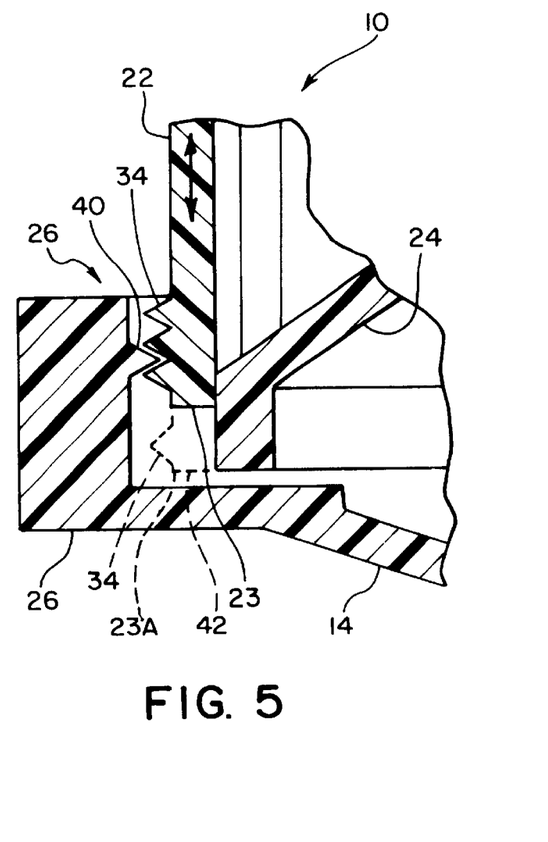
FIG. 5 is an enlarged, partial, cross-sectional view of the bottom portion of the adjustable lens array taken along line 4—4 in FIG. 1.

The teeth set 34 can be formed as an integral part of the lens 22, for example, by pressing or molding or the teeth set 33 can be fabricated separately and attached the lens 22 through the use of a fastener. Alternatively, the teeth 34 of the teeth set 33 can be on a carrier to which can be attached to the lens. It is preferable that the teeth set 33 is positioned perpendicular to the direction of adjustment. For example, when horizontal adjustment is desired as shown in FIGS. 2 and 3, it is preferable that the teeth set 33 is positioned vertically. Similarly, when vertical adjustment is desired as shown in FIGS. 4 and 5, it is preferable that the teeth set 33 is positioned horizontally. It is also preferable that when the teeth set 33 are teeth 34, the teeth 34 are longer than they are wide in order to prevent cocking of the lens array 22 relative to the sensor 16 and the lens adjuster 26.

The lens adjuster 26 is integral with front housing member 14 or attached to the front housing member 14, using attachment means known in the art, for example, screws, adhesive, glue, and the like. The lens adjuster 26 also has an inside surface 38. On the inside surface 38 is a single retaining projection 40 for engaging with the teeth 34.

Retaining projection 40 engages, or interlocks with, a pair of teeth of the teeth set 34. The retaining projection 40 can be a tooth similar to a tooth 34, a set of teeth, a pawl, or any object of any shape that, when located between a pair of adjacent teeth 34, prevents the lens 22 from moving to a second lens position 42. In FIGS. 3 and 5, a lens edge 23 can move to a new edge position 23A.

When the lens adjuster 26 is attached to the front housing 14, pressure between the teeth 34 on the lens array 22 and the retaining projection 40 is adequate to maintain the position of the lens array 22, while also allowing the teeth 34 and the retaining projection 40 to slide over each other during adjustment. In this manner, when a set of teeth 34 are positioned to engage a retaining projection 40 along one side of the lens 22, the lens 22 will not change position along that side until the retaining projection 40 is manually disengaged from the teeth 34.

Nubs 36 on the lens array 22 allow a user to grip the lens array 22 and apply pressure to move the lens array 22 to another position. The user can use finger pressure to grip the nubs 36, or alternatively the nubs 36 are shaped to receive a screw driver blade or other tool in order to move the lens array 22. The nubs 36 can be fabricated from the lens array 22, or can be attached to the lens array 22 in a manner similar to the fabrication or attachment of the teeth 34, discussed above. Additionally, the nubs 36 are preferably located on the lens array in an area where the nubs 36 will not interfere with the functioning of the lens array 22.

A slot 44 can also be located in the outer lens portion 30 so that an implement can be inserted to effectuate movement of the lens 22. For example, a user can insert a screwdriver into the slot 44, and by placing pressure on the lens array 22, disengage the teeth 34 from the retaining projection 40 of the lens adjuster 26 and force the lens array 22 to move in a desired direction. Teeth 34 reengage with the retaining projection 40 of the lens adjuster 26 when the user stops exerting pressure on the lens array 22, due to the interest resiliency of lens 22.

Figure 7:
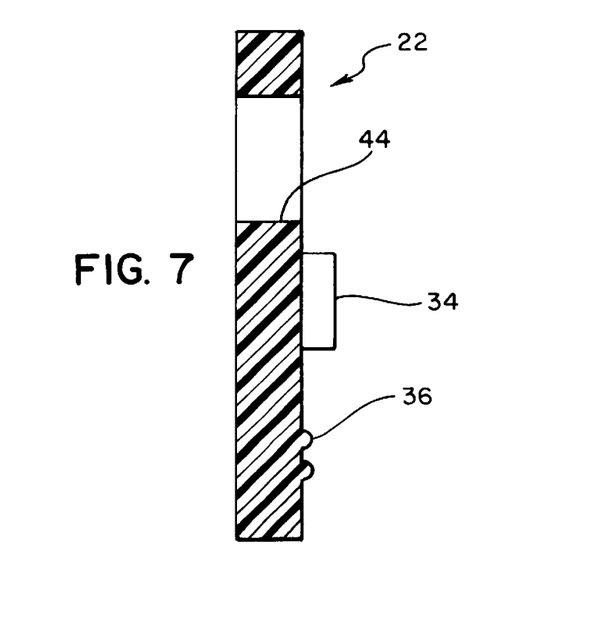
FIG. 7 is a cross-sectional view of the lens array taken along line 7—7 in FIG. 6.

Although four teeth 34 are shown in each teeth set 33, any number greater than two can be used that will allow the lens to be repositioned and held in place. Pressure between the lens retainer 24 and the lens adjuster 26 maintain the position of the lens 22 while also allowing the teeth 34 and the retaining projection 40 to slide over each other during adjustment. In this manner, when the set of teeth 33 are positioned to engage a retaining projection 40 along one side of the lens 22, the lens 22 will not change position along that side until the lens adjuster 26 is disengaged from the teeth 34 by manual pressure During adjustment of the lens 22, lens 22 can be moved relative to front housing 14 and to sensor 16. The movement of lens 22 can be in two substantially perpendicular directions; such as, substantially horizontally and substantially vertically with respect to FIG. 1. Additionally, the movement of lens 22 can be at an inclined angle relative to the horizontal and vertical axis of FIG. 1. For example, lens 22 as shown in FIG. 7, can move between two points in a horizontal direction and then in a vertical direction, or a two-step process, or in a direction inclined to the horizontal and vertical positions as a one step process. Of course lens 22 can be moved as little or as much as needed or desired.

FIGS. 8–12 depict a second embodiment of this invention. Like part numbers from the first embodiment will be used where applicable. In this second embodiment, the lens adjuster 126 is preferably based on a rack and pinion mechanism. A first set of teeth 46 located on one edge 47 of the lens 122 forms a rack 48. The type and size of the first set of teeth 46 are predetermined so as to be able to mate with a second set of teeth 50 on the pinion 52. The first set of teeth 46 can be formed, for example, by cutting out portions of the lens 122, punching the lens 122 utilizing a die, or attaching a rack having a set of teeth to the edge of the lens 122. If the first set of teeth 46 are attached by way of a rack to the edge of the lens 122, the teeth 46 may be formed on a rack of different material from the lens 122, for example, metal, and attached to the lens 112 using fasteners; such as, glue, adhesive, crimping, rivets, or any other attachment means known in the art.

Figure 9:
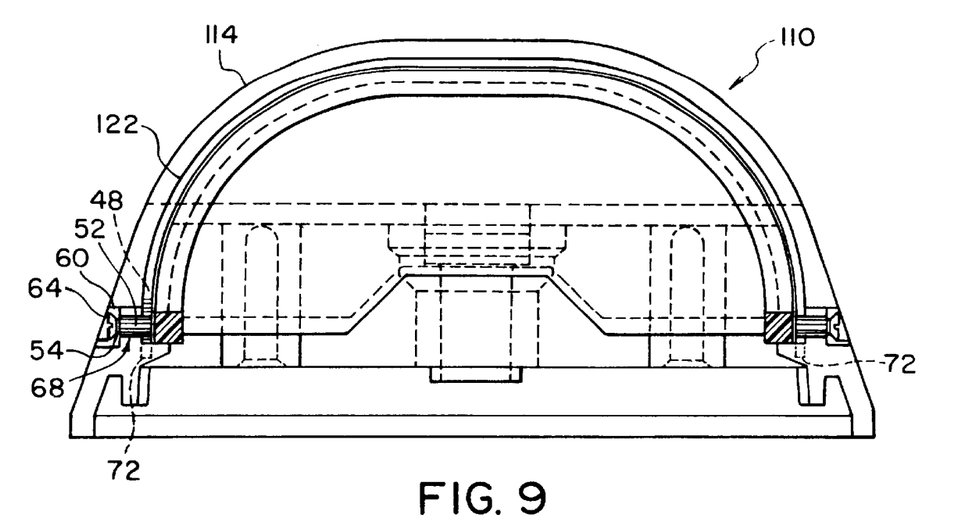
FIG. 9 is a cross-sectional view of the adjustable lens array taken along line 9—9 in FIG. 8.
Figure 10:
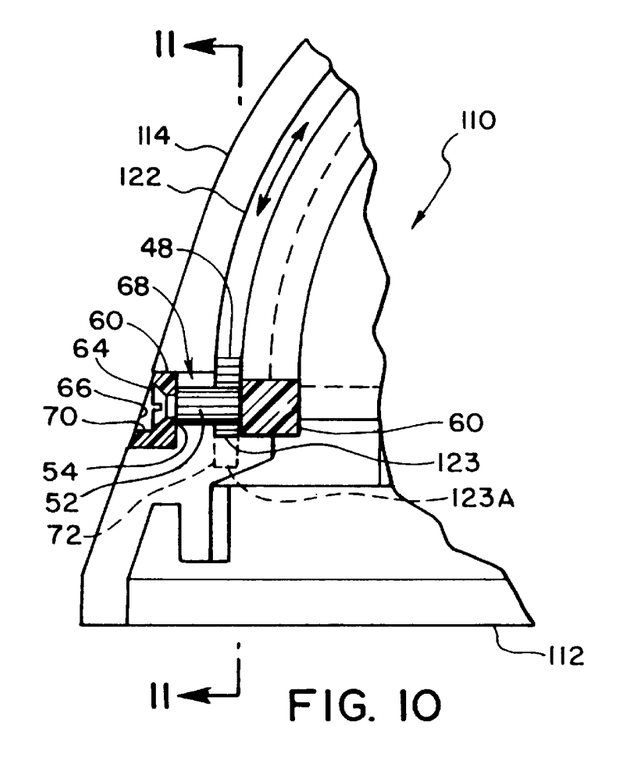
FIG. 10 in an enlarged view of one end of the adjustable lens array shown in FIG. 9.

The pinion 52 is preferably a gear having a second set of teeth 50 of similar size to the first set of teeth 46, and can be fabricated from, for example, metal or plastic. The pinion 52 is attached to a shaft 54 at one end 56. The shaft 54 passes through a hole 58 in a support block 60 which is attached to the front housing member 14. On the other end 62 of the shaft 54 is a screw head 64, which is accessible to a user from outside front housing member 114 through a hole 66 in the front housing member 114. The pinion 52, the shaft 54, and the screw head 64 form a pinion assembly 68.

The pinion assembly 68 is preferably one piece, but can be separate pieces attached by means known in the art, for example, adhesive, glue, welding, cotter pins, threaded nuts, and the like in order to pass the shaft 54 through the support block 60. For example, the gear portion, or pinion 52, can be attached to the shaft 54 using, for example, a cotter pin, a locking washer and nut, adhesive, glue, solder, or any other means of attachment known in the art. The pinion assembly 68 can be fabricated from a single piece of material, for example, metal or plastic, but may be fabricated from compatible materials that can be attached as required.

The support block 60 can be integrally fabricated concurrently with the front housing member 14, or can be fabricated separately and attached to any suitable location on the sensor module 10.

In order to retain the shaft 54 in the support block 60, the support block 60 can be formed around shaft 54 with the larger diameter head 64 and pinion 52, thus, securing the pinion assembly to block 60. Alternatively, the pinion assembly can be secured to block 60 and member 114 as known in the art. Other means for retaining the shaft 54 can be used, for example, attaching a threaded nut to the support block 60 at the entrance 70 to the hole 58.

Figure 11:
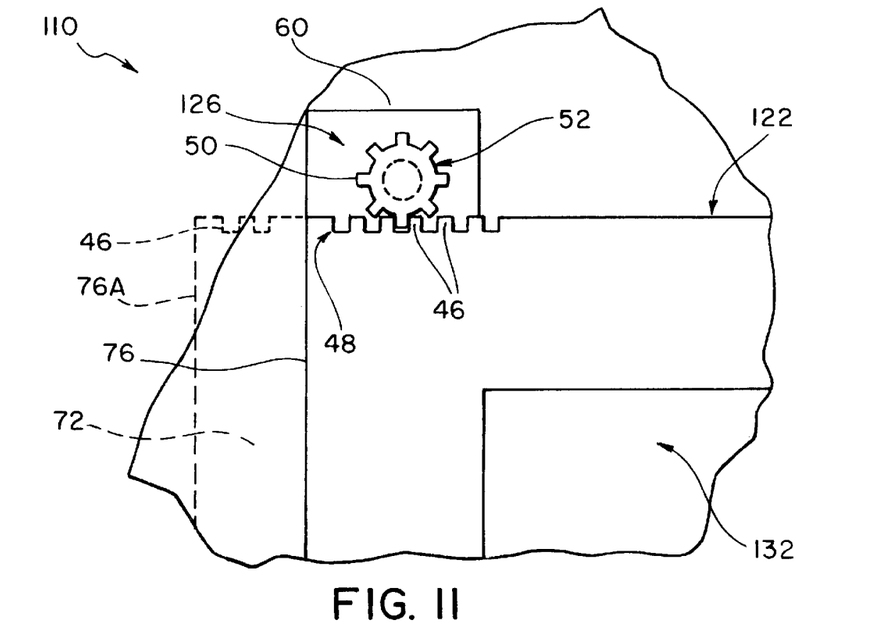
FIG. 11 is a cross-sectional view of the adjustable lens array taken along line 11—11 in FIG. 10.
Figure 12:
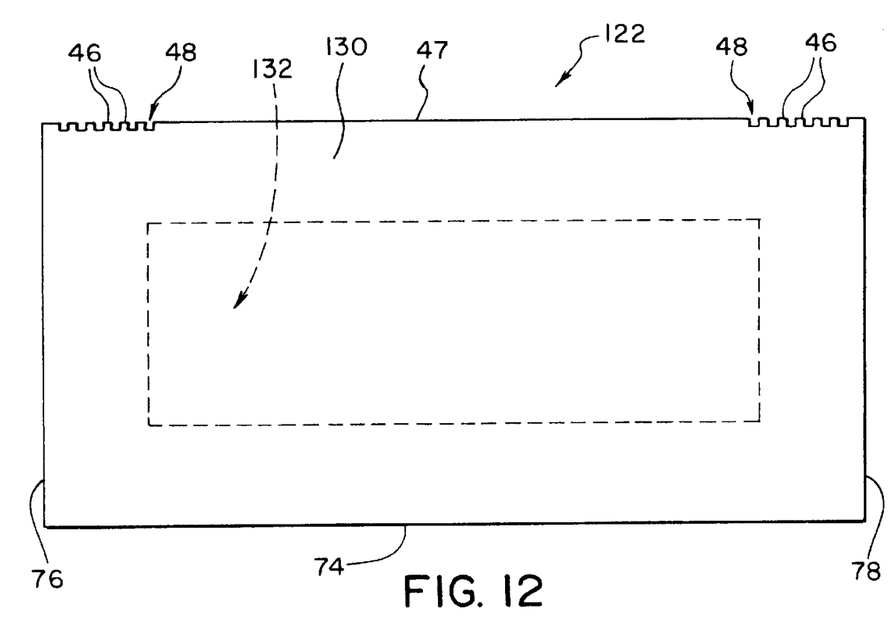
FIG. 12 is a front view of an adjustable lens array in accordance with the second embodiment of the present invention.

The screw head 64 is accessible through the hole 66 located on the front housing member 114. When the screw head 64 is rotated by a user, the pinion assembly 68 is likewise rotated, and the rack 48 moves concurrently, which causes the lens 122 to move along the predetermined path 72 by an amount equal to the amount of rotation of the pinion assembly 68. As shown in FIG. 11, when the lens 122 is moved, side edge 76 travels to a new side edge location 76A.

The screw head 64 can be any common screw head known in the art. Alternatively, the screw head 64 can be replaced with a knob that protrudes from the front housing member 114. Similarly, a screw head 64 requiring a special device to rotate the pinion assembly 68 can be used, for example, a removable hex key, an allen wrench, a torx wrench, or any other insertion and rotation implement.

Additional racks 48 and pinions 52 can be used in a device of the present invention. For example, a rack 48 and pinion 52 can be located on the opposing second edge 74 of the lens 22 for easier adjustment along the horizontal axis of FIG. 8 X-axis. Furthermore, racks 48 and pinions 52 can be placed on the first side edge 76 and the second side edge 78 of lens 22 for adjustment along the vertical axis of FIG. 8. In this manner, the lens 122 can be moved incrementally amount either side to side or up and down relative to the sensor 16.

Figure 8:
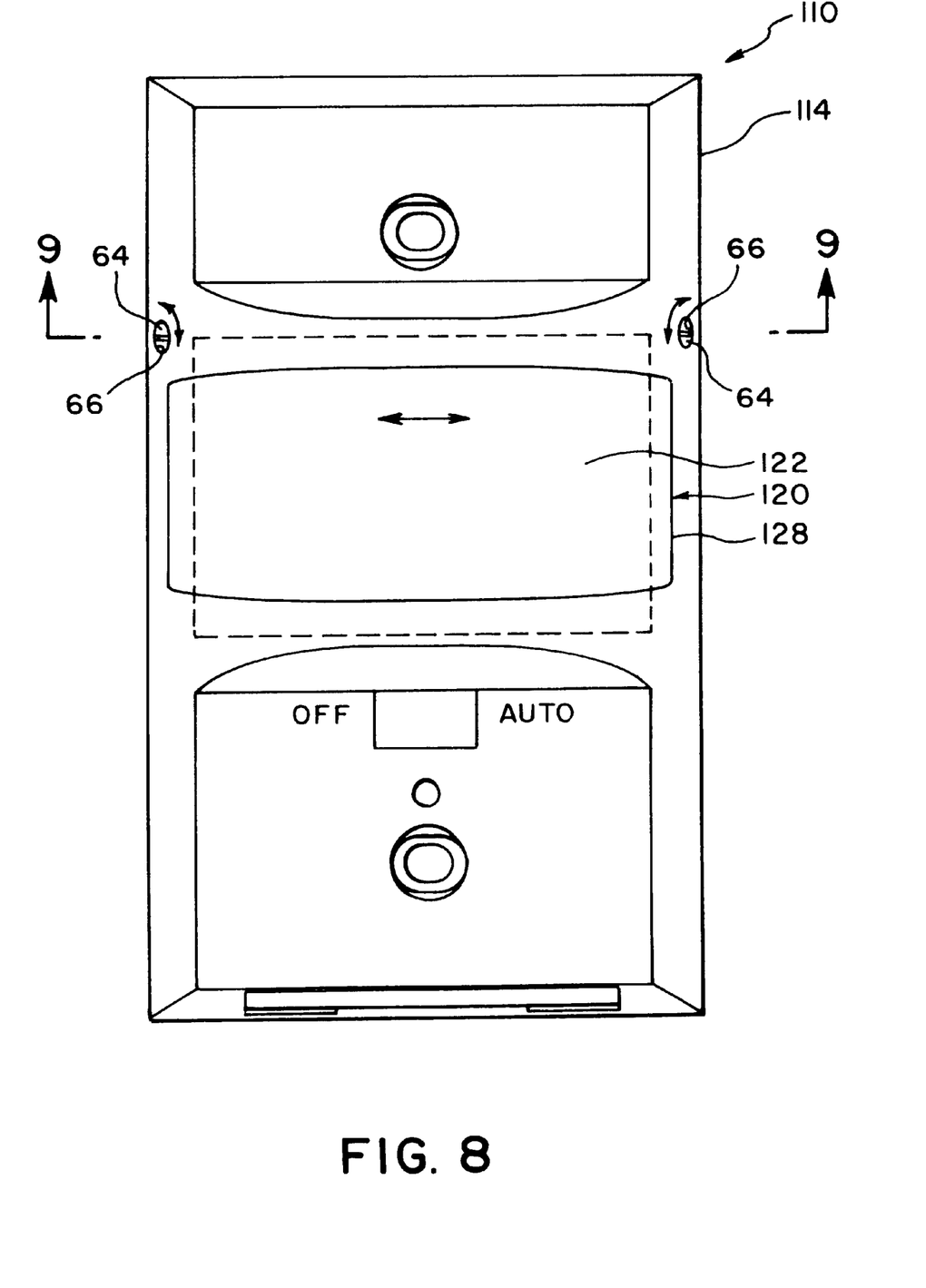
FIG. 8 is a front view of an adjustable lens array within a sensor module constructed in accordance with a second embodiment of the present invention.

During use, the second embodiment permits lens 122 to be moved in one direction by rotating head 64 of pinion 52 from outside front housing 114. This movement of heat 64 and pinion 52 results in pinion 52 rotating about its longitudinal axis. The movement of head 64 and opinion 52 can be accomplished through the use of a tool, such as a screw driver. As pinion 52 rotates, it engages the rack 48 of lens 122 and moves lens 122 in the direction of the rack 48, horizontally as shown in FIG. 8. The pinion 52 can be moved either clockwise or counterclockwise to move lens 122 back and forth in the determined direction until the proper focusing position relative to the sensor 16 is determined.

While advantageous embodiments has been chosen to illustrate the invention, it will be understood by those skilled in the art that various changes and modifications can be made therein without departing from the scope of the invention as defined in the appended claims.

What is claimed is:

1. A lens assembly, comprising
   a housing having a lens receiving area, and first and second retaining members adjacent said lens receiving area;
   a lens coupled to said housing within said lens receiving area, said lens having a first lens retaining element and a second lens retaining element, said first retaining element adjustably coupling with said first retaining member and said second retaining element adjustably coupling with said second retaining member;
   a sensor mounted to said housing and positioned within said housing and behind said lens,
   wherein said lens is adjustably movable about said sensor between a first position and a second position in a first direction as said first retaining element moves relative to said first retaining member, and
   said lens is further adjustably movable about said sensor between a third position and a fourth position in a second direction, which is transverse to said first direction, as said second retaining element moves relative to said second retaining member.

2. The assembly according to claim 1, wherein
   said first and second retaining members are first projections, and
   said first and second retaining elements are second projections.

3. The Assembly according to claim 2, wherein
   said first and second projections are spaced tooth-like projections.

4. The assembly according to claim 1, wherein
   said second direction is substantially perpendicular to said first direction.

5. The assembly according to claim 1, wherein
   said lens is a fresnal lens.

6. The assembly according to claim 1, wherein
   said lens has means for moving said lens in said first and second directions.

7. The assembly according to claim 6, wherein
   said means for moving comprises a slot.

8. A method of providing a lens, comprising the steps of:
   providing a housing having a lens receiving area, and first and second retaining members adjacent said lens receiving area;
   providing a lens coupled to said housing within said lens receiving area, said lens having a first lens retaining element and a second lens retaining element, said first retaining element adjustably coupling with said first retaining member and said second retaining element adjustably coupling to said second retaining member;
   providing a sensor mounted to said housing and positioned within said housing and behind said lens,
   moving said lens about said sensor between a first fixed position and a second fixed position in a first direction, and
   moving said lens about said sensor between a third fixed position and a fourth fixed position in a second direction, which is transverse to said first direction.

9. The method according to claim 8, wherein
   said step of moving said lens in a first direction occurs simultaneously with said step of moving said lens in said second direction.

10. The method according to claim 8, wherein
    said step of moving said lens in a first direction occurs before said step of moving said lens in said second direction.

11. A lens assembly, comprising:
    a housing having an outer surface, a lens receiving area, and first and second retaining members adjacent said lens receiving area;
    a lens coupled to said housing within said lens receiving area, said lens having a first lens retaining element and a second lens retaining element, said first retaining element adjustably coupling with said first retaining member and said second retaining element adjustably coupling with said second retaining member;
    a sensor mounted to said housing and positioned within said housing and behind said lens,
    wherein said lens is adjustably movable about said sensor between a first position and a second position in a first direction as said first retaining element moves relative to said first retaining member and said lens is adjustably movable about said sensor between said first position and said second position in said first direction as said second retaining element moves relative to said second retaining member,
    said first retaining member extends from said outer surface of said housing to direct contact with said lens, and said first retaining member being movable between an original position and a final position while engaging said lens to move said lens between said first and second positions, and
    said second retaining member extends from said outer surface of said housing to direct contact with said lens, and said second retaining member being movable between an original position and a final position while engaging said lens to move said lens between said first and second positions.

12. The assembly according to claim 11, wherein
    said first retaining member includes a pinion, and
    said first retaining element is a rack of tooth-like projections.

13. The assembly according to claim 12, wherein
    said first retaining member includes a head adapted for engagement by a tool.

14. The assembly according to claim 13, wherein
    said head has a slot, which receives a screwdriver.

15. The assembly according to claim 11, wherein
    said lens is a fresnal lens.

16. A method of adjusting a lens, comprising the steps of:
    providing a housing having an outer surface, a lens receiving area, and first and second retaining members adjacent said lens receiving area;
    providing a lens coupled to said housing within said lens receiving area, said lens having a first lens retaining element and a second lens retaining element, said first retaining element adjustably coupling with said first retaining member and said second retaining element adjustably coupling with said second retaining member;

providing a sensor mounted to said housing and positioned within said housing and behind said lens;

moving said lens about said sensor between a first position and a second position in a first direction as said first retaining element moves relative to said first retaining member by moving said first retaining member, and simultaneously moving said first and second retaining members to move said lens between said first and second positions.

17. The method according to claim 16, wherein said step of moving said lens includes moving said first retaining member about a first axis.

18. The method according to claim 17, wherein said step of moving said lens in a first direction includes using a tool to move said first retaining member about said first axis.

19. A lens assembly, comprising a housing having a lens receiving area, and first and second retaining members adjacent said lens receiving area;

a lens coupled to said housing within said lens receiving area, said lens having a first lens retaining element and a second lens retaining element, said first retaining element adjustably coupling with said first retaining member;

a sensor mounted to said housing and positioned within said housing and behind said lens, wherein said lens is adjustably movable about said sensor between a first position and a second position in a first direction as said first retaining element moves relative to said first retaining member, and said lens is further adjustably movable about said sensor between a third position and a fourth position in a second direction, which is transverse to said first direction, as said second retaining element moves relative to said second retaining member; and wherein said first and second retaining members are first projections, and said first and second retaining elements are second projections.

20. a lens assembly according to claim 19, wherein said second retaining element adjustably couples to said second retaining member.

21. The assembly according to claim 19, wherein said first and second projections are spaced tooth-like projections.

22. The assembly according to claim 19, wherein said second direction is substantially perpendicular to said first direction.

23. The assembly according to claim 19, wherein said lens is a fresnal lens.

24. The assembly according to claim 19, wherein said lens has means for moving said lens in said first and second directions.

25. The assembly according to claim 24, wherein said means for moving comprises a slot.

26. A lens assembly, comprising a housing having a lens receiving area, and first and second retaining members adjacent said lens receiving area;

a lens coupled to said housing within said lens receiving area, said lens having a first lens retaining element and a second lens retaining element, said first retaining element adjustably coupling with said first retaining member;

a sensor mounted to said housing and positioned within said housing and behind said lens, wherein said lens is adjustably movable about said sensor between a first position and a second position in a first direction as said first retaining element moves relative to said first retaining member, and said lens is further adjustably movable about said sensor between a third position and a fourth position in a second direction, which is transverse to said first direction, as said second retaining element moves relative to said second retaining member; and wherein said lens has a means for moving said lens in first and second directions, and said means for moving comprising a slot.

27. The lens assembly according to claim 26, wherein said second retaining element adjustably couples to said second retaining member.

28. A lens assembly according to claim 26, wherein wherein said first and second retaining members are first projections, and said first and second retaining elements are second projections.

29. The assembly according to claim 28, wherein said first and second projections are spaced tooth-like projections.

30. The assembly according to claim 26, wherein said second direction is substantially perpendicular to said first direction.

31. The assembly according to claim 26, wherein said lens is a fresnal lens.

32. A lens assembly, comprising:

a housing having an outer surface, a lens receiving area, and a first retaining member adjacent said lens receiving area;

a lens coupled to said housing within said lens receiving area, said lens having a first lens retaining element, said first retaining element adjustably coupling with said first retaining member;

a sensor mounted to said housing and positioned within said housing and behind said lens, wherein said lens is adjustably movable about said sensor between a first position and a second position in a first direction as said first retaining element moves relative to said first retaining member, and said first retaining member extending from said outer surface of said housing to direct contact with said lens, and said first retaining member being movable between an original position and a final position while engaging said lens to move said lens between said first and second positions, and wherein said first retaining member includes a pinion, and said first retaining element is a rack of tooth-like projections.

33. The assembly according to claim 32, wherein:

said housing has a second retaining member adjacent said lens receiving area;

said lens has a second lens retaining element, said second retaining element adjustably coupling with said second retaining member;

wherein said lens is adjustably movable about said sensor between said first position and said second position in said first direction as said second retaining element moves relative to said second retaining member, and said second retaining member extends from said outer surface of said housing to direct contact with said lens, and said second retaining member being movable between an original position and a final position while engaging said lens to move said lens between said first and second positions.

34. The assembly according to claim 32, wherein said first retaining member includes a head adapted for engagement by a tool.

35. The assembly according to claim 34, wherein said head has a slot, which receives a screwdriver.

36. The assembly according to claim 32, wherein said lens is a fresnal lens.

\* \* \* \* \*